United States Patent [19]

Powers et al.

[11] Patent Number: 4,780,931
[45] Date of Patent: Nov. 1, 1988

[54] FEEDING DEVICE FOR PATTY FORMING MACHINE

[75] Inventors: Richard G. Powers, Overland Park; James E. Anderson, Shawnee Mission, both of Kans.

[73] Assignee: Marlen Research Corporation, Overland Park, Kans.

[21] Appl. No.: 14,597

[22] Filed: Feb. 13, 1987

[51] Int. Cl.⁴ .............................................. A22C 7/00
[52] U.S. Cl. ...................................................... 17/32
[58] Field of Search ...................................... 17/32, 39

[56] References Cited

U.S. PATENT DOCUMENTS

| | | | |
|---|---|---|---|
| Re. 30,096 | 9/1979 | Richards | 17/32 |
| 3,052,915 | 9/1962 | Müller | 17/39 X |
| 3,456,285 | 7/1969 | Miller et al. | 17/39 |
| 3,473,189 | 10/1969 | Middleton | 17/39 X |
| 4,097,962 | 7/1978 | Alley et al. | 17/39 |
| 4,191,309 | 3/1980 | Alley et al. | 17/39 X |

Primary Examiner—Willie G. Abercrombie
Attorney, Agent, or Firm—Hovey, Williams, Timmons & Collins

[57] ABSTRACT

A conversion device is provided which permits an existing self-contained meat patty forming machine to be adapted for use with a separate, high capacity meat pump, so as to increase the output capacity of the patty former. The conversion structure includes an elongated, apertured meat delivery tube adapted to be used in lieu of an existing pivotal valving tube provided with the original machine, together with an accumulator coupled to the delivery tube. Operation of the separate pumping assembly is governed by that of the accumulator, and, ultimately, the operation of the patty forming apparatus. In this fashion the speed of the separate pumping assembly can be matched with that of the patty former so as to maintain continuous, trouble free operation.

13 Claims, 2 Drawing Sheets

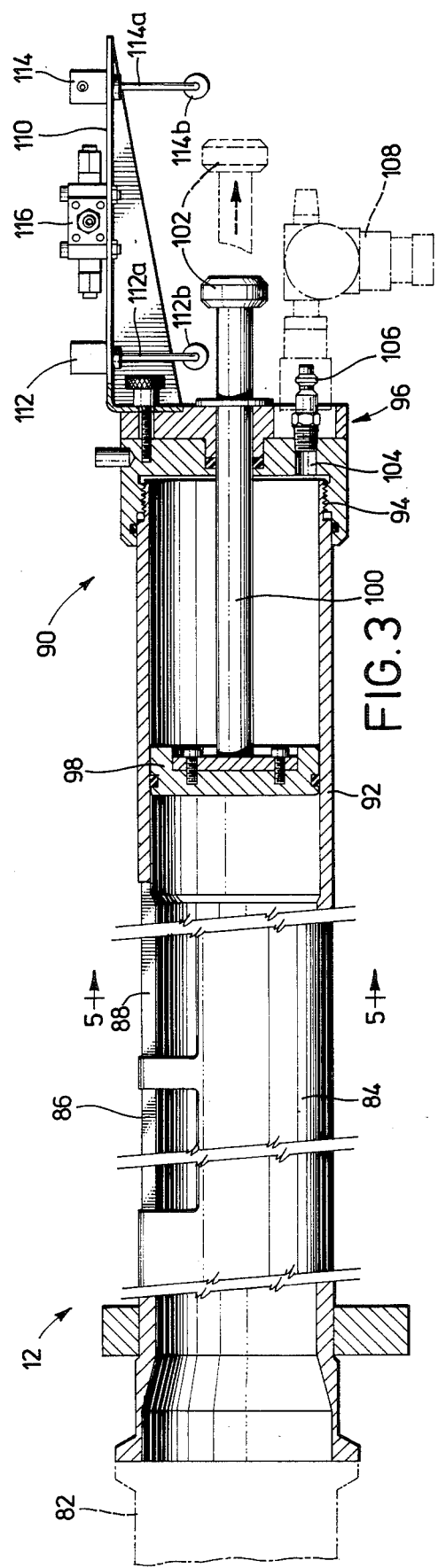
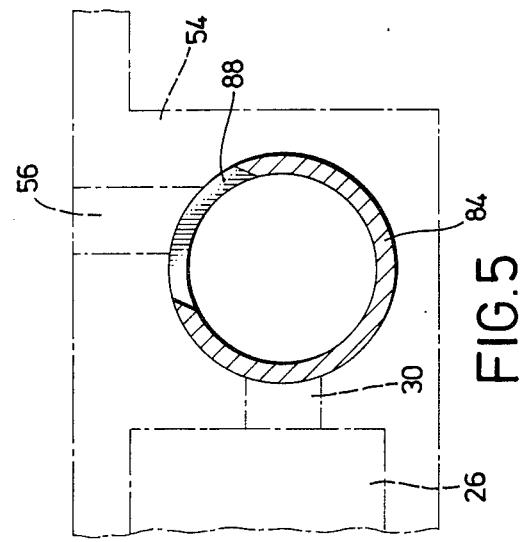
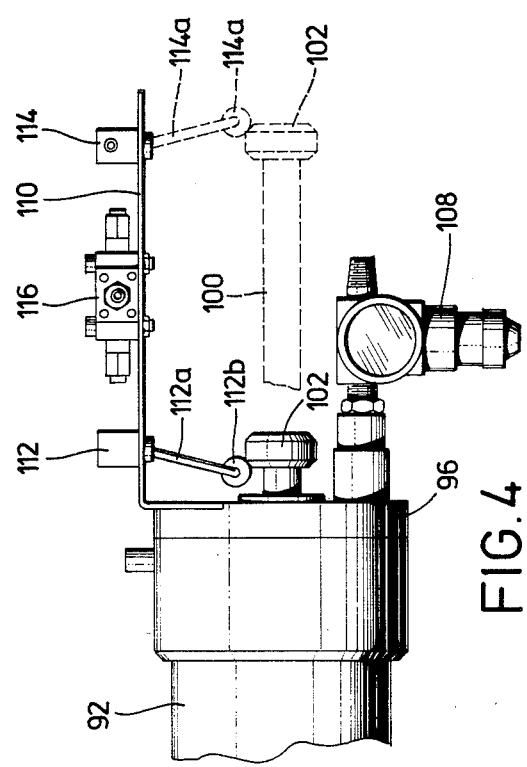

FEEDING DEVICE FOR PATTY FORMING MACHINE

BACKGROUND OF THE INVENTION

1. Field of the Invention

The present invention is broadly concerned with a conversion device for use with an existing, self-contained meat patty forming device in order to permit adaptation of the device for use with a high capacity food pump, in order to thereby materially increase the output capacity of the patty former. More particularly, it is concerned with such a conversion apparatus which is particularly designed to permit so-called Formax patty forming machines to be modified by attachment thereto of a high capacity food pump such as that commercialized by the Marlen Research Corporation of Overland Park, Kans.; advantageously, the conversion device includes an accumulator chamber operatively coupled via a feedback circuit for controlling the operation of the separate high capacity pump in response to patty forming operations. With the conversion device of the present invention, it is possible to more than double the output of a conventional Formax machine, at a cost far less than the price of a complete new Formax.

2. Description of the Prior Art

Many large fast food chains require that their beef patties have certain uniform characteristics such as weight, diameter and density. As a consequence of these rather stringent requirements, it has been found desirable in certain instances to specify that particular brands and models of equipment be used in patty forming operations, because in this way the most uniform patties can be achieved.

One such patty forming device which has achieved rather widespread use is the so-called Formax patty forming machine. Such a machine is described for example in U.S. Pat. No. 3,887,964. Broadly speaking such Formax machines would include an upper meat hopper equipped with a plurality of vertically oriented auger feeders designed to fill a pair of juxtaposed underlying tubular chambers. The latter are each equipped with a shiftable, hydraulically actuated piston designed to force respective charges of meat forwardly towards a patty forming mechanism forming a part of the overall apparatus. Such patty forming mechanism includes a reciprocal slide plate together with plunger means for depositing formed patties on a conveyor belt.

In addition, the Formax machine has an intermediate valving arrangement located between the meat-receiving piston chambers and the slide plate patty forming mechanism. This valving assembly is in the form of an elongated, slotted, axially pivotal tube. In operation, the tube is shifted between positions alternately communicating the individual meat-filled piston chambers and the slide plate forming mechanism. In this way, a continuous supply of meat is delivered to the patty forming mechanism.

While Formax patty forming machines of the type described have achieved a measure of commercial success, the output capacity thereof is inherently limited. That is to say, most present day Formax machines have a maximum capacity of 4,000 pounds of meat per hour, or 80 cycles of the patty forming mechanism per minute, whichever is achieved first. This output capacity is significantly lower than many present day patty forming operations require, and as a consequence processors have been forced to purchase multiple Formax machines in order to meet demand. Obviously, this is a costly proposition.

At the same time, many existing food pumps are known which have a capacity far in excess of the self-contained Formax devices. To give but one example, Marlen Research Corporation of Overland Park, Kans. commercializes a line of dual piston food pumps which can easily achieve an output capacity 7,000 to 8,000 pounds per hour. Furthermore, such existing high capacity food pumps can be purchased at a price far lower than that of a complete self-contained Formax. Therefore, if it were possible to readily adapt an existing Formax machine to a Marlen or other high capacity food pump and thereby double the output of the Formax, the cost advantages would be considerable as compared with the alternative of purchasing another complete Formax machine.

SUMMARY OF THE INVENTION

The present invention overcomes the problems noted above, and provides a conversion apparatus particularly designed for the rapid conversion of an existing self-contained Formax patty forming machine to accept a high capacity pump, all without expensive modifications to the Formax or in anyway detracting from the qualities of the ultimate meat at patties produced. Broadly speaking, the conversion apparatus of the present invention includes an elongated, apertured, stationary tube designed to be used in lieu of the existing pivotal valving tube provided with the Formax machine, with one end of the stationary tube being adapted for connection to a separate pumping assembly. Accumulator means is also operatively coupled with the other end of the stationary tube, with the accumulator means including structure for providing meat flow in excess of the nominal output rate of the modified machine for short periods of time, to thereby meet the demand for meat over the entire operational cycle. Thus, the accumulator serves to accumulate meat delivered to the apertured tube when the separate meat delivery assembly delivers meat at a rate greater than the forming rate of the patty forming apparatus forming a part of the Formax, and for passing accumulated meat to the apertured tube as needed to accommodate meat demand. Most advantageously, the accumulator structure and separate meat delivery assembly are coupled via feedback circuitry so that operation of the meat delivery assembly can be controlled in response to patty forming operations, thereby assuring a constant supply of meat.

The accumulator means forming a part of the overall conversion structure is advantageously in the form of an elongated hollow tubular body operatively coupled with the apertured stationary tube and having a reciprocal piston therewithin. Further, means is provided for biasing the piston toward the apertured tube, such biasing means preferably being in the form compressed fluid (e.g. air) directed against the face of the piston remote from the apertured tube.

In actual practice, use of a conversion assembly in accordance with the invention on a present day Formax can readily increase the output capacity thereof by a factor of 100 percent or more, particularly when use is made of a Marlen twin piston reciprocating food pump as the separate meat delivery assembly.

BRIEF DESCRIPTION OF THE DRAWINGS

FIG. 3 is a sideview in partial vertical section and with certain parts illustrated in phantom depicting the conversion apparatus of the present invention;

FIG. 4 is a fragmentary side view illustrating the operation of the conversion assembly at the respective limits thereof as governed by space limit switches; and FIG. 5 is a sectional view taken along line 5—5 of FIG. 3 and depicting the orientation of the stationary, apertured tube portion of the conversion apparatus, positioned within the Formax machine in lieu of the conventional, pivotal tube used therein.

DESCRIPTION OF THE PREFERRED EMBODIMENT

Figure 1A:
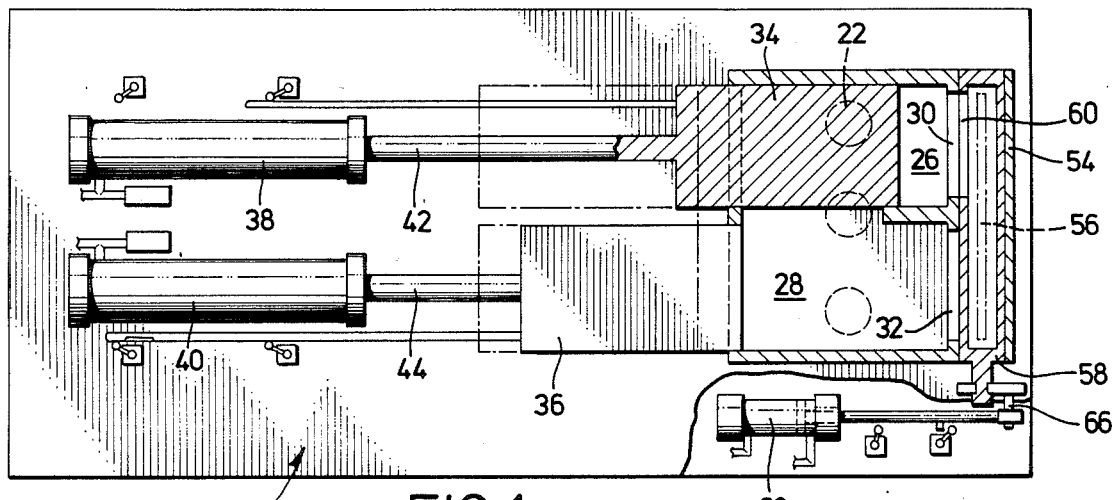
FIG. 1a is a top view partially in section and with parts broken away for clarity illustrating the construction and operation of the meat delivery and valving portions of a conventional Formax patty forming machine.
Figure 1B:
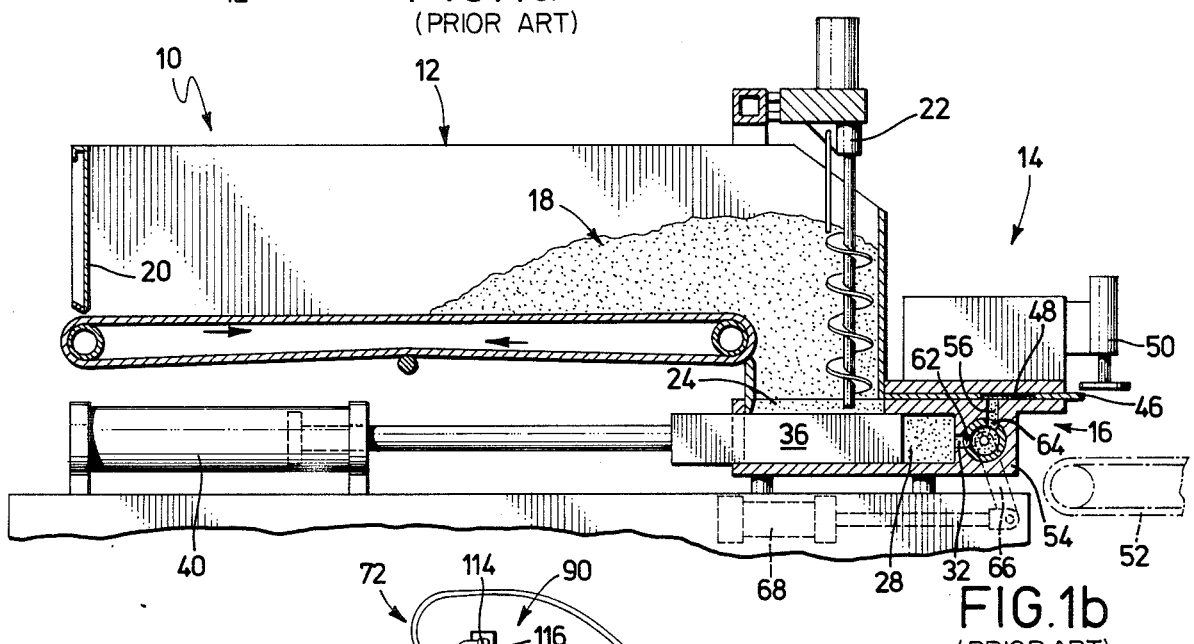
FIG. 1b is a side view, partially in section and with certain parts shown in phantom, of a complete Formax patty forming machine including the meat delivery assembly, valving apparatus and slide plate-type patty forming mechanism.

Attention is first directed to FIGS. 1a and 1b of the drawings which illustrate the prior art Formax machine. In order to best understand the structural and functional advantages of the present invention, a brief description of the existing Formax is necessary.

Accordingly, it will be seen that the self-contained Formax patty forming machine 10 broadly includes a meat feeding mechanism 12, patty forming apparatus 14 and valve means 16 interposed between the mechanism 12 and forming apparatus 14. In practice, meat 18 is fed by the mechanism 12 to the apparatus 14 in order to form successive meat patties, with the entire operation being governed by the valving means 16.

In more detail, the meat feeding mechanism 12 includes a large hopper 20 adapted to hold the comminuted meat 18, with the hopper 20 being equipped with a plurality of vertically extending, axially rotable auger feeders 22. The hopper 20 has a lowermost open output end 24, and it will be seen that the auger feeders 22 are designed to forcibly direct the meat 18 downwardly through output end 24. The overall feeding mechanism 12 further includes a pair of side-by-side, elongated, fore and aft extending meat-receiving chambers 26, 28 each having an opening therein communicating with output end 24 of hopper 20. Each chamber 26, 28 also communicates with an elongated, laterally extending delivery slot 30, 32 adjacent the forward end thereof.

Each chamber 26, 28 further receives a fore and aft reciprocable piston 34, 36. The pistons are designed to operate in an alternating fashion, and, during the forward strokes thereof, to expel meat within the associated chamber through the forwardmost slots 30, 32. Each piston is powered by means of a conventional hydraulic cylinder 38, 40, and for this purpose each of the latter is provided with a forwardly extending piston rod 42, 44 connected to an associated piston 34, 36.

The patty forming apparatus 14 is of essentially conventional construction and includes an apertured, fore and aft reciprocable slide plate 46 having a series of patty-forming holes therethrough. In its retracted orientation as illustrated in FIG. 1b, the apertures 48 receive meat from the valving means 16 in a manner to be described, whereupon the plate is shifted forwardly into registry with reciprocable upright plungers 50. These plungers then move downwardly in order to dislodge the formed patties from the plate 46, and to allow the patties to fall by gravity onto underlying conveyor belt 52.

The valving assembly 16 includes an elongated block section 54 having a laterally extending circular bore therethrough generally beneath slide plate 46. The block section 54 includes the slots 30, 32 described above which communicate with the respective piston chambers 26, 26; moreover, the block section includes elongated, laterally extending, continuous upright slot 56 which communicates the circular bore in the apertures 48 of slide plate 46 when the latter is in its retracted position.

The overall valving means 16 further includes an elongated, tubular, axially pivotal valve tube 58 having a total of three slots therein. In particular, tube 58 has an air of circumferentially offset meat entry slots designed for alternate alignment with the delivery slots 30, 32. Moreover, the tube 58 has a wider meat outlet slot 64 extending along the length thereof which is designed to remain in constant communication with the slot 56 regardless of which of the slots 60, 62 is in registry with its associated delivery slot 30, 32.

Pivotal operation of the tube 58 is effected by means of a link 66 and a piston and cylinder assembly 68.

In the operation of the Formax machine 10, meat is delivered from the output end 24 of hopper 20 into the juxtaposed chambers 26, 28. When the piston 36 is in its forward delivery stroke, the valve tube 58 is oriented as viewed in FIG. 1b, with meat entry slot 62 of the tube 58 being in alignment with meat delivery slot 32, and with output slot 64 communicating with slot 56 of block section 54. In this fashion, meat is delivered from the chamber 36 to the apertures 48 of slide plate 46 for patty forming operations.

When the piston 36 reaches the forward end of its stroke, it is retracted and piston 34 is moved forward. Also, tube 58 is pivoted so as to align the meat entry slot 60 with meat delivery slot 30, and to maintain output slot 64 in communication with block section slot 56. Hence, during this operational sequence, meat received within chamber 26 is fed to the slide plate 46.

As explained previously, the Formax machine is described in U.S. Pat. No. 3,887,964, and such patent is hereby incorporated by reference herein.

Figure 2:
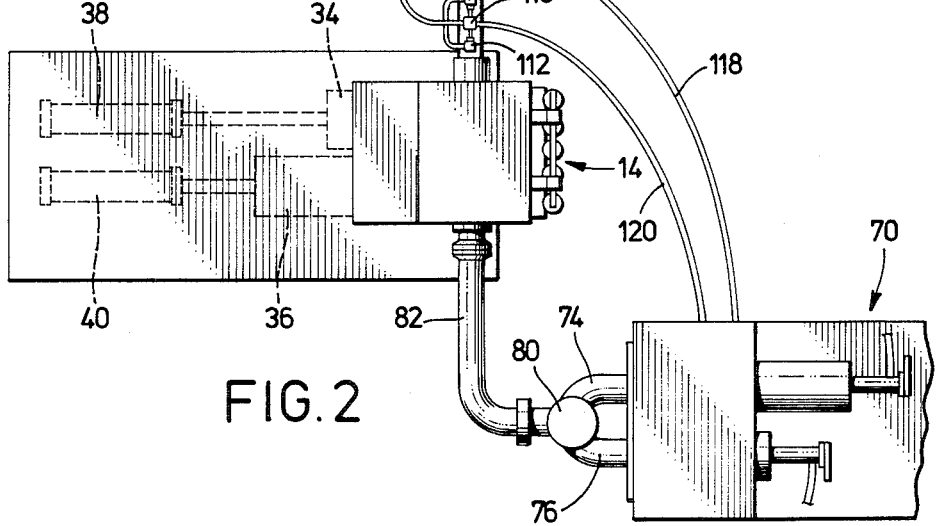
FIG. 2 is a fragmentary top view illustrating the Formax machine depicted in FIGS. 1a and 1b equipped with the conversion apparatus of the present invention and operatively coupled with a separate, high capacity, twin piston Marlen food pump for supplying meat to the patty forming mechanism.

Attention is next directed to FIG. 2 which illustrated a modified Formax machine making use of a separate high capacity food pump 70 and the conversion apparatus of the present invention, the latter being broadly referred to by the numeral 72. The food pump as depicted is of the twin piston reciprocable variety commercialized by Marlen Research Corporation of Overland Park, Kans. Such a twin piston pump is described in, inter alia, U.S. Pats. Nos. 3,456,285 and 4,097,962, such patents being incorporated by reference herein.

In more detail, the food pump 70 is equipped with a pair of output tubes 74, 76 which are joined by a flapper valve 80. The output from valve 80 then passes through a delivery tube 82 for connection with the input end of conversion apparatus 72 in a manner to be described. By virtue of the reciprocating operation of the preferred food pump 70 however, a continual flow of meat is directed through delivery tube 82, typically at very high rate on the order of 7,000 to 8,000 pounds per hour.

Attention is next directed to FIG. 3 which illustrates in detail the overall conversion apparatus 72. Specifically, the apparatus 72 includes an elongated meat-receiving tube 84 provided with a pair of axially spaced apart, elongated, laterally extending meat delivery slots 86, 88 therethrough. The lefthand end of tube 84 as viewd in FIG. 3 is designed to mate with the end of tube 82 remote from pump 70 as can be readily seen from a study of FIGS. 2 and 3.

The righthand end of tube 84 as viewed in FIG. 3 is provided with a hollow accumulator 90 in the form of a tubular body 92. The body 92 is in effect an extension of tube 84 as will be readily seen. The extreme righthand end of body 92 is threaded as at 94, and receives an apertured end cap 96. A slidable piston 98 is situated within body 92 and is laterally shiftable along the length thereof. A piston rod 100 is affixed to piston 90 and extends rightwardly as viewed in FIG. 3 through an appropriate sealed central opening provided in cap 96. The outermost end of rod 100 is situated outside the confines of body 92 and is provided with an enlarged actuator head 102 which is important for purposes to be described.

The cap 96 is further provided with a bore 104 therethrough, which is threaded for and receives a quick coupler 106. An air regulator 108 is in turn affixed to coupler 106, and a source of pressurized air (not shown, but may be derived from the pneumatic system of the Marlen pump) is coupled to the regulator in order to provide a regulated source of pressurized air to the interior of body 92 and against the face of piston 98 remote from tube 84.

The two-piece cap 96 further supports a horizontally extending bracket 110, the latter having a pair of spaced apart, depending, pneumatic, 3-way valve limit switches 112, 114 thereon. Finally, a double pilot 3-way control valve 116 is affixed to bracket 110 between the limit switches 112, 114. It will be seen in this respect that each limit switch includes a depending pivotal arm 112a, 114a, with each arm carrying a lowermost enlarged head 112b, 114b.

In actual practice, the Formax machine 10 is modified by removing the pivotal valve tube 58 thereof and decoupling piston and cylinder assembly 68 together with all structure upstream of the valve tube, namely the meat feeding mechanism 12 and all its associated components. The conversion apparatus 72 is then operatively attached to the Formax machine, with the meat receiving tube 84 thereof being positioned within block section 54 in lieu of the original tube 58. This structure is illustrated in FIG. 5, and it will be seen that the tube 84 is located within the laterally extending bore of head section 54 in such manner that the meat delivery slots 86, 88 are in communication with upwardly extending slot 56 leading to slide plate 46 (not shown in FIG. 5). On the other hand, the accumulator 90 extends outwardly beyond block section 54 of the original Formax machine, as best seen in FIG. 2. In order to complete the connection between the conversion apparatus 72 and the pump 70, appropriate pneumatic lines 118, 120 are coupled between the accumulator limit switch arrangement and the pump so as to govern the operation of the latter in response to operation of the accumulator 90 and, ultimately, the patty forming apparatus 14. Specifically, the line 118 is a compressed air supply line providing source air to the central valve 116 and the limit switches 112, 114. The outputs of the latter are each connected to a respective pilot of the central valve 116, and line 120 extends from the output of the valve 116 to the pneumatic speed control apparatus associated with the Marlen pump.

The Marlen pump is normally operated in a two-speed mode, i.e., a pair of operational speeds are selected which bracket the selected nominal operating speed of the patty forming mechanism. For example, if the selected patty forming speed is 4200 pounds per hour, the hydraulic system of the Marlen pump would typically be set at two different operational speeds, for example 4100 pounds per hour and 4300 pounds per hour. High or low speed opertion of the Marlen is governed by the presence or absence of a pneumatic signal from valve 116 via line 120 (see FIG. 2). Thus, if the Marlen operates at a speed in excess of the patty forming mechanism, meat will accumulate within the accumulator structure, thus causing piston 98 to shift rightwardly until knob 102 contacts limit switch 114. At this point pilot air from the limit switch 114 is directed to the central control valve 116, and the appropriate signal is sent via line 120 to the Marlen pump in order to decrease the operational speed thereof. By the same token, if the Marlen operates at a speed slower than that required to service the patty forming mechanism, the accumulator is gradually depleted and piston 98 moves rightwardly as viewed in FIG. 3 until knob 102 engages limit switch 112; at this point the pilot connection between switch 112 and valve 116 serves to operate the latter and send the appropriate control signal to the Marlen pump so as to increase the operational speed thereof.

It has been found that the accumulator piston will reciprocate during normal operation as meat is alternately accumulated within tube 92 and expelled therefrom to feed the patty forming mechanism. At the same time, the piston will typically "drift" either leftwardly or rightwardly depending upon the operational speed of the Marlen as compared with that of the patty forming mechanism until one of the limit switches is reached and a speed correction is effected as described above.

Thus, it will be seen that the accumulator serves to collect meat fed to the apertured tube 84, which occurs when the slide plate 46 is in its extended position and in those instances where the Marlen pump is delivering meat at a rate greater than the forming rate of the patty forming apparatus. The accumulator structure also serves to pass accumulated meat back into the apertured tube for ultimate feeding to the patty forming apparatus when such meat is required to maintain the operation of the patty forming structure. This occurs when the slide plate is in its retracted position with the apertures thereof ready to be filled with meat, and also during other regular pump operations; that is to say, regardless of the operational speed of the Marlen, the accumulator will normally feed meat. The immediate demand for meat when the slide plate retracts normally cannot be furnished at a high enough rate by the Marlen pump, hence causing the accumulator to feed. Of course, the pneumatically biased piston 98 serves to expel such accumulated meat from the accumulator tube into the apertured tube 84.

It will thus be seen that the operational speed of the separate Marlen pumping assembly can be readily adjusted during patty forming operations so as to accommodate different and varying output speeds of the patty forming apparatus. At the same time, the Marlen has an output capacity far in excess of the meat feeding mechanism forming a part of the original Formax machine. Thus, the output of an existing Formax can be dramatically increased through the use of the present invention.

Moreover, the present invention is subject to numerous modifications depending upon intended use. Thus, while the preferred device makes use of a speed sensing mechanism as described, such is only necessary when using non-pressure sensitive pumps or when use is made of a grinder between the pump and meat tube 84. A pump that is pressure sensitive can operate without the need for speed control. Further, the accumulator is depicted herein as being coaxial with the tube 84; this orientation can be altered through use of a "T" or other appropriate piping.

We claim:

1. In a meat patty forming device having meat feeding mechanism, a patty-forming, and meat valve means operatively interposed between said mechanism and apparatus, said valve means including an elongated, slotted axially pivotal meat-conveying tube, the improvement which comprises structure for converting said patty-forming apparatus for use with a separate meat delivery assembly having a higher rated meat delivery capacity than said mechanism, said conversion structure comprising:
    an elongated, stationary, apertured tube for use in said valve means in lieu of said pivotal tube, said apertured tube presenting an inlet end and being in constant communication with said patty-forming apparatus;
    conduit means for operatively coupling said inlet end of said tube with said separate meat delivery assembly; and
    accumulator means operatively connected with said elongated stationary apertured tube for accumulating meat fed to said apertured tube, and for passing accumulated meat to the elongated stationary, apertured tube when meat is required to maintain the operation of the patty-forming apparatus,
    said accumulator means being separate from said meat feeding mechanism and comprising structure defining an accumulator chamber, said accumulator chamber-defining structure being located in spaced relationship to and downstream from the inlet end of said elongated stationary apertured tube.

2. The invention of claim 1, said accumulator chamber-defining structure comprising an elongated hollow body operatively coupled with said elongated stationary apertured tube and having a reciprocable piston therewithin, and means for biasing said piston towards said elongated stationary apertured tube.

3. The invention of claim 2, including means for sensing the amount of meat accumulated within said hollow body and control means for operatively interconnecting said sensing means and separate meat delivery assembly for varying the delivery rate of the latter in response to the amount of meat accumulated within the hollow body.

4. The invention of claim 3, said sensing means comprising a pair of spaced limit switches; and switch actuating means shiftable in response to reciprocation of said piston for operating said limit switches.

5. The invention of claim 2, said body comprising an elongated tube coaxially aligned and forming an extension of said elongated stationary apertured tube.

6. The invention of claim 2, said biasing means comprising means for directing pressurized fluid against the face of said piston remote from said elongated stationary tube.

7. Conversion structure for converting an existing, self-contained meat patty forming device for use with a separate high capacity meat delivery assembly, said device having meat feeding mechanism and patty-forming apparatus coupled with said mechanism for receiving meat from the mechanism and forming meat patties therefrom, said conversion structure comprising:
    an elongated stationary tube presenting an inlet end and structure defining a meat delivery output aperture located in spaced relationship to and downstream from said inlet end;
    means for connecting said inlet end of said tube with said separate meat delivery assembly; and
    accumulator means operatively connected with said tube for accumulating meat fed to said tube during patty forming operations, and for passing accumulated meat to the tube when meat is required to maintain the operation of the patty forming apparatus,
    said accumulator means being separate from said meat feeding mechanism and comprising structure defining an accumulator chamber, said accumulator chamberdefining structure being located in spaced relationship to and downstream from the meat delivery output aperture.

8. The conversion structure of claim 7, said accumulator chamber-defining structure comprising an elongated hollow body operatively coupled with said tube and having a reciprocable piston therewithin, and means for biasing said piston towards said tube.

9. The structure of claim 8, including means for sensing the amount of meat accumulated within said hollow body and control means for operatively interconnecting said sensing means and separate meat delivery assembly for varying the delivery rate of the latter in response to the amount of meat accumulated within the hollow body.

10. The invention of claim 9, said sensing means comprising a pair of spaced limit switches; and switch actuating means shiftable in response to reciprocation of said piston for operating said limit switches.

11. The invention of claim 8, said body comprising an elongated tube coaxially aligned and forming an extension of said tube.

12. The invention of claim 8, said biasing means comprising means for directing pressurized fluid against the face of said piston remote from said tube.

13. Apparatus for delivery of meat from a pump or the like to a patty-forming apparatus adapted for receiving meat and forming meat patties therefrom, said apparatus comprising:
    an elongated tube presenting an inlet end and structure defining a meat delivery output aperture located in spaced relationship to and downstream from said inlet end;
    means for connecting said inlet end of said tube with said pump or the like; and
    accumulator means operatively connected with said tube for accumulating meat fed to said tube during patty forming operations, and for passing accumulated meat to the tube when meat is required to maintain the operation of the patty forming apparatus,
said accumulator means being separate from said pump or the like and comprising structure defining an accumulator chamber, said accumulator chamber-defining structure being located in spaced relationship to and downstream from the said meat delivery output aperture.

* * * * *